(12) United States Patent
Ryu et al.

(10) Patent No.: US 12,439,189 B2
(45) Date of Patent: Oct. 7, 2025

(54) ELECTRONIC DEVICE COMPRISING MICROPHONE MODULE

(71) Applicant: Samsung Electronics Co., Ltd., Suwon-si (KR)

(72) Inventors: Heejun Ryu, Suwon-si (KR); Heeseok Jung, Suwon-si (KR); Hanbom Park, Suwon-si (KR); Sunghyup Lee, Suwon-si (KR); Sungkeun Koo, Suwon-si (KR); Myeongjin Kim, Suwon-si (KR); Dongju Yeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 18/338,806

(22) Filed: Jun. 21, 2023

(65) Prior Publication Data

US 2023/0336900 A1    Oct. 19, 2023

Related U.S. Application Data

(63) Continuation of application No. PCT/KR2021/019228, filed on Dec. 16, 2021.

(30) Foreign Application Priority Data

Jan. 11, 2021   (KR) .................. 10-2021-0003575

(51) Int. Cl.
*H04R 1/08*     (2006.01)
*G06F 1/16*     (2006.01)
(Continued)

(52) U.S. Cl.
CPC ........... *H04R 1/083* (2013.01); *G06F 1/1658* (2013.01); *G06F 1/1684* (2013.01); *H04R 1/028* (2013.01);
(Continued)

(58) Field of Classification Search
CPC .......... H04R 1/083; H04R 1/028; H04R 1/04; H04R 2499/11; H04R 1/44; H04R 1/2853;
(Continued)

(56) References Cited

U.S. PATENT DOCUMENTS 10,609,190 B2   3/2020  Chen
2013/0108082 A1  5/2013  Dave et al.
(Continued)

FOREIGN PATENT DOCUMENTS

CN    106019771 A    10/2016
CN    110266850 A    9/2019
(Continued)

OTHER PUBLICATIONS

Extended European Search Report dated May 27, 2024; European Appln. No. 21917915.7-1218 / PCT/KR2021019228.
(Continued)

*Primary Examiner* — Tuan D Nguyen
(74) *Attorney, Agent, or Firm* — Jefferson IP Law, LLP

(57) ABSTRACT

An electronic device is provided. The electronic device includes a rear plate which includes a first through-hole, a flash member which includes a flash lens and a support structure accommodating the flash lens and including a second through-hole opposite to the rear plate, and at least a part of which is disposed in the first through-hole, a support member which supports the flash member and includes a third through-hole opposite to at least a part of the second through-hole, and a microphone module which is disposed under the support member and covers the third through-hole.

22 Claims, 16 Drawing Sheets

(51) Int. Cl.
  *H04R 1/02*    (2006.01)
  *H04R 1/04*    (2006.01)
  *H04M 1/02*    (2006.01)

(52) U.S. Cl.
  CPC ............... *H04R 1/04* (2013.01); *H04M 1/026* (2013.01); *H04R 2499/11* (2013.01)

(58) Field of Classification Search
  CPC ...... H04R 1/086; H04R 1/08; H04R 2499/15; H04M 1/026; H04M 1/0264; H04M 1/03; G06F 1/1658; G06F 1/1684; G06F 1/1626; G06F 1/1656; G06F 1/1688; G06F 1/686
  See application file for complete search history.

(56) References Cited

U.S. PATENT DOCUMENTS

| | | |
|---|---|---|
| 2015/0219608 A1 | 8/2015 | Choi et al. |
| 2018/0090974 A1 | 3/2018 | Elkayam et al. |
| 2018/0183912 A1 | 6/2018 | Lim et al. |
| 2018/0241861 A1 | 8/2018 | Kim et al. |
| 2019/0320050 A1 | 10/2019 | Lim et al. |
| 2020/0221002 A1 | 7/2020 | Akana et al. |
| 2020/0329303 A1 | 10/2020 | Sim et al. |
| 2022/0014830 A1 | 1/2022 | Behles et al. |

FOREIGN PATENT DOCUMENTS

| | | |
|---|---|---|
| CN | 110401747 A | 11/2019 |
| CN | 210137345 U | 3/2020 |
| CN | 210297765 A | 4/2020 |
| CN | 212909610 U | 4/2021 |
| CN | 114430430 A | 5/2022 |
| JP | 2017-195613 A | 10/2017 |
| KR | 10-2011-0043350 A | 4/2011 |
| KR | 10-2015-0068132 A | 6/2015 |
| KR | 10-2015-0092579 A | 8/2015 |
| KR | 10-2018-0073115 A | 7/2018 |
| KR | 10-2018-0096178 A | 8/2018 |
| KR | 10-2019-0028284 A | 3/2019 |
| KR | 10-2019-0054546 A | 5/2019 |
| KR | 10-2019-0121119 A | 10/2019 |
| KR | 10-2020-0119105 A | 10/2020 |
| WO | 2019/050560 A1 | 3/2019 |

OTHER PUBLICATIONS

Russian Office Action with Search Report and English translation dated Nov. 13, 2024; Russian Appln. No. 2023119768/28(042720).
International Search Report with Written Opinion and English translation dated Mar. 24, 2022; International Appln. No. PCT/KR2021/019228.
Russian Decision to Grant with English translation dated Mar. 11, 2025; Russian Appln. No. 2023119768.
Korean Office Action with English translation dated Apr. 14, 2025; Korean Appln. No. 10-2021-0003575.

ELECTRONIC DEVICE COMPRISING MICROPHONE MODULE

CROSS-REFERENCE TO RELATED APPLICATION(S)

This application is a continuation application, claiming priority under § 365 (c), of an International application No. PCT/KR2021/019228, filed on Dec. 16, 2021, which is based on and claims the benefit of a Korean patent application number 10-2021-0003575, filed on Jan. 11, 2021, in the Korean Intellectual Property Office, the disclosure of which is incorporated by reference herein in its entirety.

BACKGROUND

1. Field

The disclosure relates to an electronic device including a microphone module.

2. Description of Related Art

Owing to the development of information and communication technology and semiconductor technology, various functions are integrated in a single portable electronic device. For example, an electronic device may implement not only a communication function but also an entertainment function such as games, a multimedia function such as music/video playback, a communication and security function such as mobile banking, schedule management, and an electronic wallet function. Such electronic devices are miniaturized so that users may conveniently carry them.

The above information is presented as background information only to assist with an understanding of the disclosure. No determination has been made, and no assertion is made, as to whether any of the above might be applicable as prior art with regard to the disclosure.

SUMMARY

The design of electronic devices is under study to improve the aesthetics of the electronic devices.

An electronic device (e.g., a portable terminal) may include a microphone module, and the microphone module may obtain external sound through a microphone hole formed in a housing. However, when a microphone hole is disposed separately in the housing or when a microphone hole is disposed in a camera window or a camera deco member, the aesthetics may be reduced. In addition, when the microphone hole is disposed in the camera window or the camera deco member, a connection member (e.g., a C-clip) for electrical connection between the microphone module and a main printed circuit board is required, and pressure may be applied to a rear plate by the connection member.

Aspects of the disclosure are to address at least the above-mentioned problems and/or disadvantages and to provide at least the advantages described below. Accordingly, an aspect of the disclosure is to provide an electronic device using an internal space disposed between a flash member and a rear plate as a microphone duct.

Additional aspects will be set forth in part in the description which follows and, in part, will be apparent from the description, or may be learned by practice of the presented embodiments.

In accordance with an aspect of the disclosure, an electronic device is provided. The electronic device includes a rear plate including a first through hole, a flash member at least partially disposed within the first through hole and including a flash lens and a support structure accommodating the flash lens and including a second through hole facing the rear plate, a support member supporting the flash member and including a third through hole facing at least a part of the second through hole, and a microphone module disposed under the support member and covering the third through hole.

In accordance with another aspect of the disclosure, an electronic device is provided. The electronic device includes a rear plate including a first through hole, a flash member including a support structure including a second through hole facing the rear plate, and a protrusion structure extending from the support structure and at least partially disposed within the first through hole, a support member supporting the flash member and including a third through hole facing at least a part of the second through hole, a printed circuit board connected to the support member and including a fourth through hole facing the third through hole, and a microphone module disposed on the printed circuit board and covering the second through hole, the third through hole, and the fourth through hole.

According to various embodiments of the disclosure, an electronic device may use an internal space and a through hole disposed between a flash member and a rear plate as a microphone duct. Due to the absence of a separate microphone hole exposed on the rear plate, the aesthetics of the electronic device may be increased, and the manufacturing cost and manufacturing time of the electronic device may be reduced.

According to various embodiments of the disclosure, a microphone module may be disposed on a printed circuit board using a sealing member. Because a connection member providing pressure to the rear plate is excluded, lifting of the rear plate may be prevented or reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
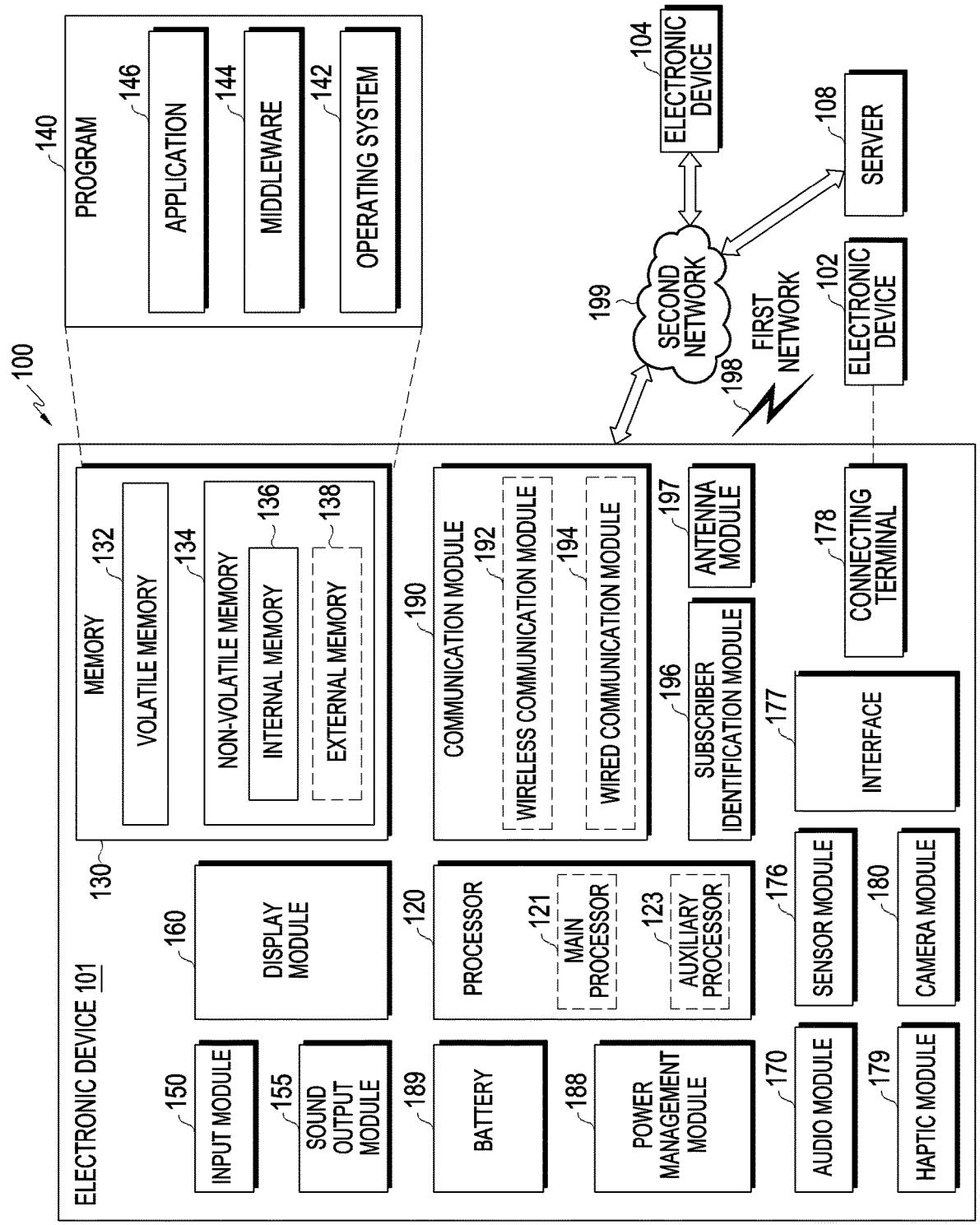
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In a certain embodiment, at least one of the components (e.g., the connecting terminal 178) may be omitted from the electronic device 101, or one or more other components may be added in the electronic device 101. In a certain embodiment, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include at least one of the volatile memory 132 or the non-volatile memory 134. The non-volatile memory 134 may include at least one of an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
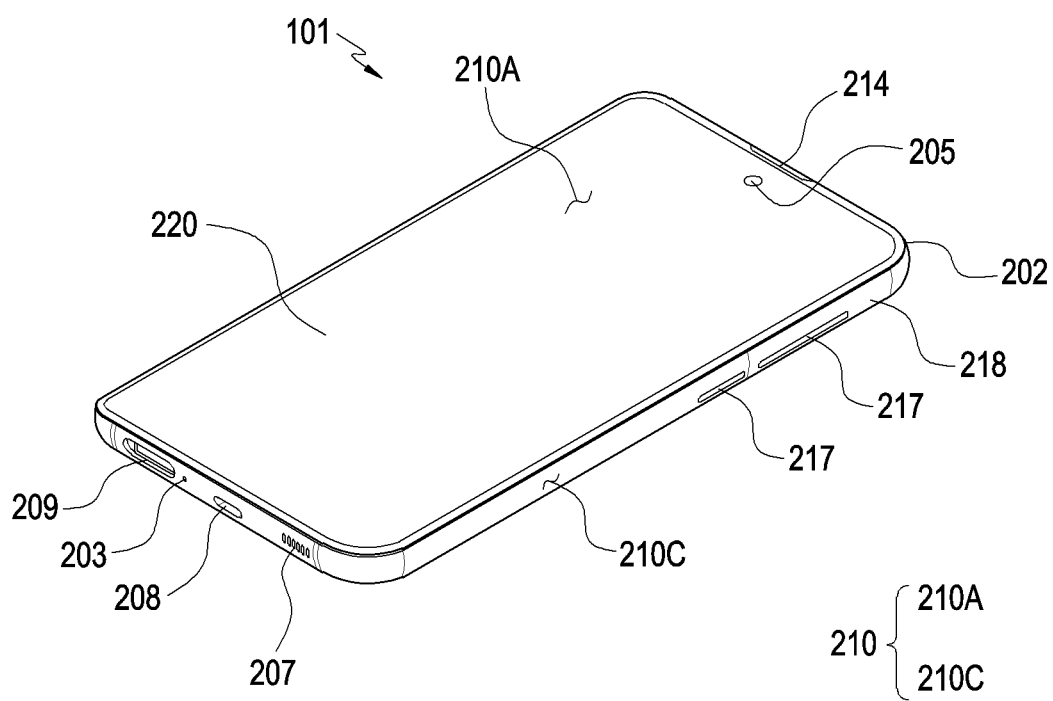
FIG. 2 is a front perspective view illustrating an electronic device according to an embodiment of the disclosure.

FIG. 2 is a front perspective view illustrating an electronic device according to an embodiment of the disclosure.

Figure 3:
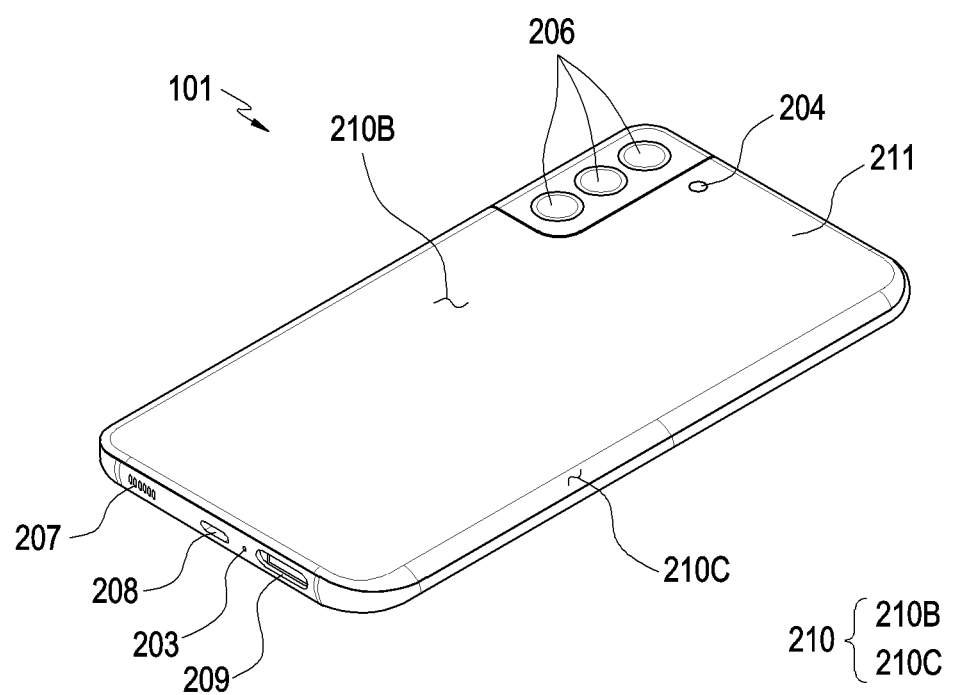
FIG. 3 is a rear perspective view illustrating an electronic device according to an embodiment of the disclosure.

FIG. 3 is a rear perspective view illustrating an electronic device according to an embodiment of the disclosure.

Referring to FIGS. 2 and 3, an electronic device 101 according to an embodiment may include a housing 210 which includes a front surface 210A, a rear surface 210B, and a side surface 210C surrounding a space between the front surface 210A and the rear surface 210B. In an embodiment (not shown), the housing 210 may refer to a structure that forms a part of the front surface 210A of FIG. 2, the rear surface 210B of FIG. 3, and the side surface 210C. According to an embodiment, at least a part of the front surface 210A may be formed by a front plate 202 (e.g., a glass plate or polymer plate including various coating layers) which is at least partially substantially transparent. The rear surface 210B may be formed by a rear plate 211. The rear plate 211 may be formed of, for example, glass, ceramic, a polymer, a metal (e.g., titanium (Ti), stainless steel (STS), or magnesium (Mg)), or a combination of at least two of these materials. The side surface 210C may be coupled with the front plate 202 and the rear plate 211 and formed by a side bezel structure (or "side member") 218 including a metal and/or a polymer. In a certain embodiment, the rear plate 211 and the side bezel structure 218 may be integrally formed and include the same material (e.g., glass, a metallic material such as aluminum, or ceramic). In an embodiment, the front surface 210A and/or the front plate 202 may be interpreted as a part of a display 220. According to an embodiment, the housing 210 may include the front plate 202 and the rear plate 211.

According to an embodiment, the electronic device 101 may include at least one of the display 220, audio modules 203, 207, and 214 (e.g., the audio module 170 of FIG. 1), a sensor module (e.g., the sensor module 176 of FIG. 1), camera modules 205 and 206 (e.g., the camera module 180 of FIG. 1), key input devices 217 (e.g., the input module 150 of FIG. 1), or connector holes 208 and 209 (e.g., the connecting terminal 178 of FIG. 1). In a certain embodiment, the electronic device 101 may not be provided with at least one (e.g., the connector hole 209) of the components or additionally include other components.

According to an embodiment, the display 220 may be visually exposed, for example, through a substantial portion of the front plate 202. In a certain embodiment, at least a part of the display 220 may be exposed through the front plate 202 forming the front surface 210A. According to an embodiment, the display 220 may be a flexible display or a foldable display.

According to an embodiment, a surface (or the front plate 202) of the housing 210 may include a view area formed by visual exposure of the display 220. For example, the view area may include the front surface 210A.

In an embodiment (not shown), the electronic device 101 may include a recess or an opening formed in a part of the view area (e.g., the front surface 210A) of the display 220, and include at least one of the audio module 214, a sensor module (not shown), a light emitting element (not shown), or the camera module 205, which is aligned with the recess or the opening. In an embodiment (not shown), the electronic device 101 may include at least one of the audio module 214, the sensor module (not shown), the camera module 205, a fingerprint sensor (not shown), or the light emitting element (not shown) on the rear surface of the view area of the display 220.

In an embodiment (not shown), the display 220 may be incorporated with or disposed adjacent to a touch sensing circuit, a pressure sensor that measures the intensity (pressure) of a touch, and/or a digitizer that detects a magnetic field-based stylus pen.

In a certain embodiment, at least some of the key input devices 217 may be disposed in the side bezel structure 218.

According to an embodiment, the audio modules 203, 207, and 214 may include, for example, a microphone hole 203 and speaker holes 207 and 214. A microphone for obtaining an external sound may be disposed in the microphone hole 203, and in a certain embodiment, a plurality of microphones may be disposed to detect the direction of a sound. The speaker holes 207 and 214 may include an external speaker hole 207 and a receiver hole 214 for calls. In a certain embodiment, the speaker holes 207 and 214 and the microphone hole 203 may be implemented as a single hole, or a speaker (e.g., a piezo speaker) may be included without the speaker holes 207 and 214.

According to an embodiment, the sensor module (not shown) may detect an internal operation state or external environmental state of the electronic device 101 and generate an electrical signal or data value corresponding to the detected state. The sensor module (not shown) may include, for example, a first sensor module (not shown) (e.g., a proximity sensor) and/or a second sensor module (not shown) (e.g., a fingerprint sensor), disposed on the front surface 210a. The sensor module (not shown) may include, for example, a third sensor module (not shown) (e.g., a hear rate monitor (HRM) sensor) and/or a fourth sensor module (not shown) (e.g., a fingerprint sensor), disposed on the rear surface 210B. In a certain embodiment (not shown), the fingerprint sensor may be disposed on the rear surface 210b as well as on the front surface 210a (e.g., the display 220). The electronic device 101 may further include a sensor module (not shown), for example, at least one of a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor (not shown).

According to an embodiment, the camera modules 205 and 206 may include, for example, a front camera module 205 disposed on the front surface 210A of the electronic device 101, and a rear camera module 206 and/or a flash 204 disposed on the rear surface 210B of the electronic device 101. Each of the camera modules 205 and 206 may include one or more lenses, an image sensor, and/or an image signal processor. The flash 204 may include, for example, a light emitting diode (LED) or a xenon lamp. In a certain embodiment, two or more lenses (an IR camera, a wide-angle lens, and a telephoto lens) and image sensors may be arranged on one surface of the electronic device 101.

According to an embodiment, the key input devices 217 may be arranged on the side surface 210C of the housing 210. In an embodiment, the electronic device 101 may not include some or any of the above key input devices 217, and the key input devices 217 which are not included may be implemented in other forms such as soft keys on the display 220.

According to an embodiment, the light emitting element (not shown) may be disposed, for example, on the front surface 210A of the housing 210. The light emitting element (not shown) may provide, for example, state information about the electronic device 101 in the form of light. In an embodiment, the light emitting element (not shown) may provide, for example, a light source interworking with an operation of the front camera module 205. The light emitting element (not shown) may include, for example, an LED, an IR LED, and/or a xenon lamp.

According to an embodiment, the connector holes 208 and 209 may include a first connector hole 208 that may accommodate a connector (e.g., a universal serial bus (USB) connector) for transmitting and receiving power and/or data to and from an external electronic device and a connector (e.g., an earphone jack) for transmitting and receiving an audio signal to and from an external electronic device, and/or a second connector hole 209 for accommodating a storage device (e.g., a subscriber identity module (SIM) card). According to an embodiment, the first connector hole 208 and/or the second connector hole 209 may be omitted.

Figure 4:
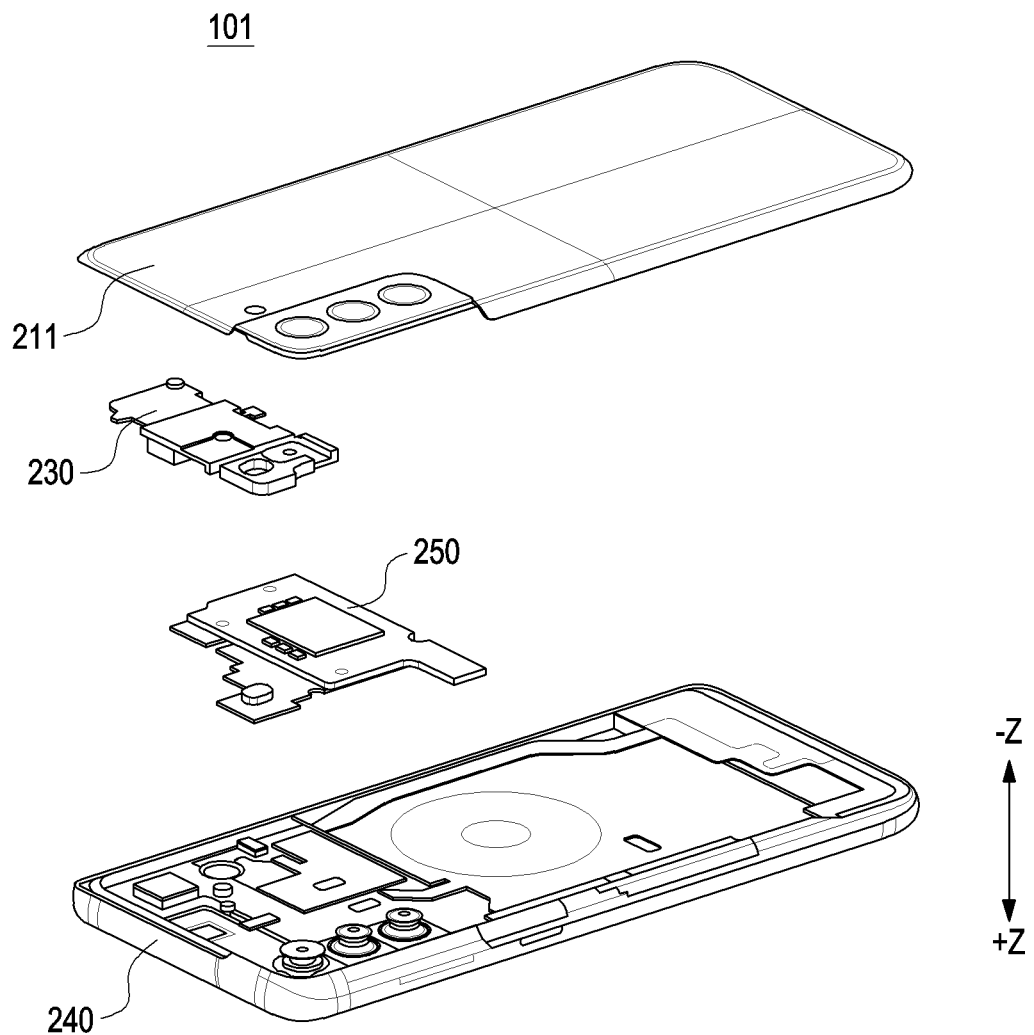
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, the electronic device 101 may include the rear plate 211, a first support member 230, a second support member 240, and a printed circuit board (PCB) 250.

According to various embodiments, the rear plate 211 may form at least a part of the exterior of the electronic device 101. For example, the rear plate 211 may form the rear surface (e.g., the rear surface 210B of FIG. 2) and/or the side surface (e.g., the side surface 210C of FIG. 2) of the electronic device 101.

According to various embodiments, the first support member 230 may be disposed within the housing (e.g., the housing 210 of FIG. 2). According to an embodiment, the first support member 230 may be disposed under the rear plate 211 (e.g., in a +Z direction). For example, the first support member 230 may be disposed between the rear plate 211 and the second support member 240. According to an embodiment, the first support member 230 may accommodate an electronic component (e.g., the audio module 170 of FIG. 1).

According to various embodiments, the second support member 240 may support components of the electronic device 101. For example, a component (e.g., the PCB 250) or a battery (e.g., battery 189 of FIG. 1) of the electronic device 101 may be mounted on the second support member 240. According to an embodiment, a display (e.g., the display 220 of FIG. 2) may be disposed on one surface of the second support member 240, and the PCB 250 may be disposed on the other surface of the second support member 240. The second support member 240 may form at least a part of the side surface (e.g., the side surface 210C of FIG. 2). According to an embodiment, the second support member 240 may be made of a metal material and/or a non-metal (e.g., polymer) material.

According to various embodiments, the PCB 250 may be disposed on the second support member 240. According to an embodiment, at least a part of the PCB 250 may be disposed between the first support member 230 and the second support member 240. According to an embodiment, the PCB 250 may accommodate a processor (e.g., the processor 120 of FIG. 1), memory (e.g., the memory 130 of FIG. 1), and/or an interface (e.g., the interface 177 of FIG. 1).

Figure 5A:
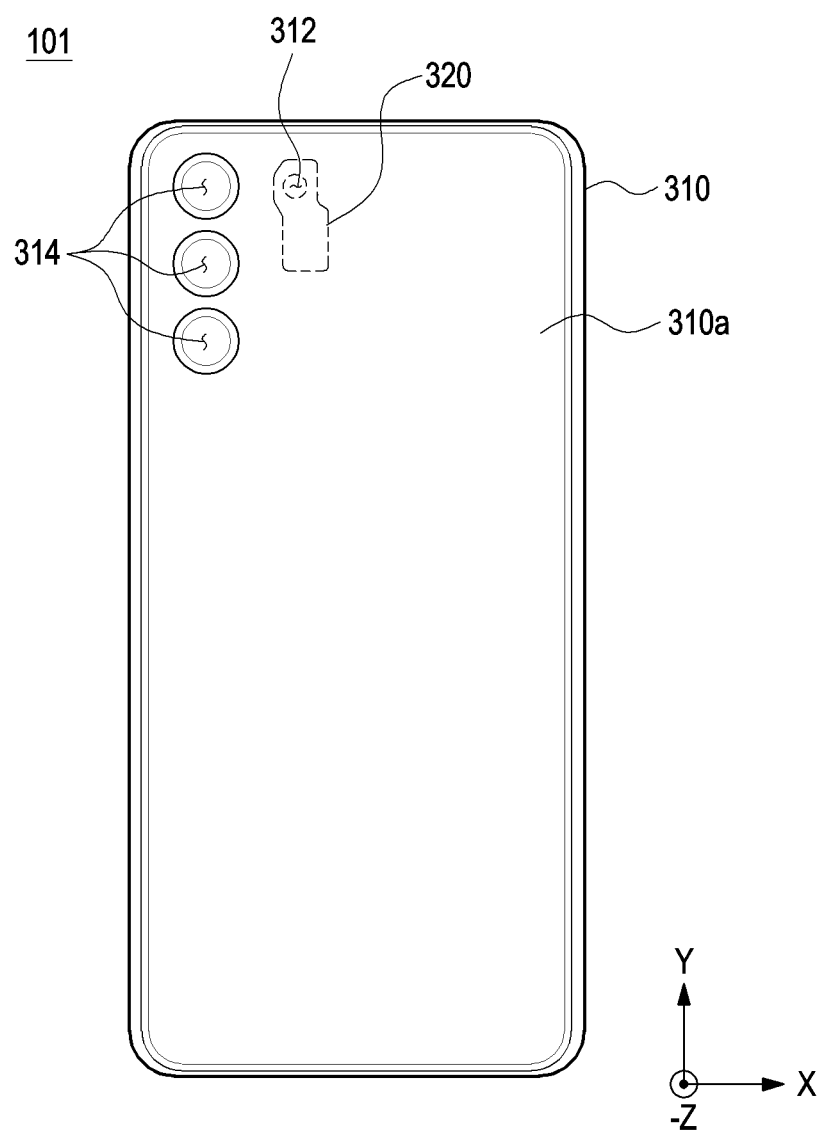
FIG. 5A is a front view illustrating a rear plate with a flash member attached thereto, according to an embodiment of the disclosure.
Figure 5B:
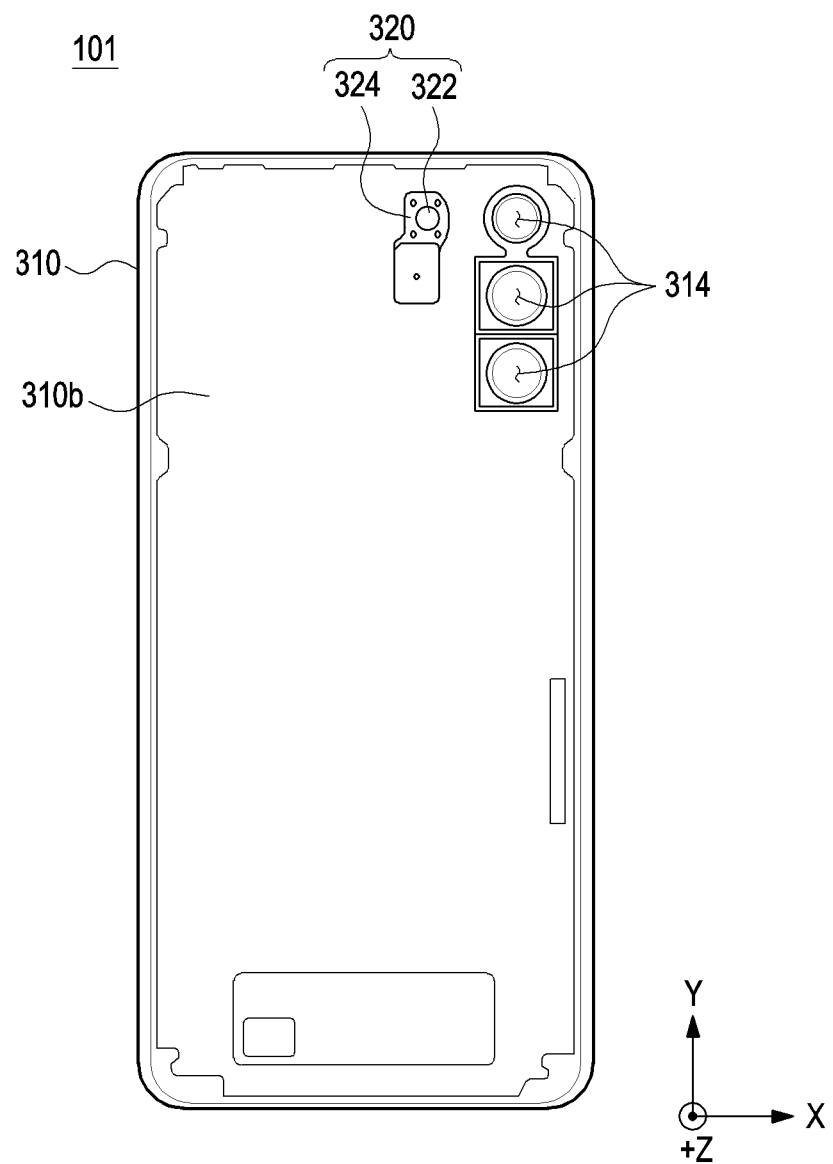
FIG. 5B is a rear view illustrating the rear plate with the flash member attached thereto, according to an embodiment of the disclosure.

FIG. 5A is a front view illustrating a rear plate with a flash member attached thereto according to an embodiment of the disclosure, and FIG. 5B is a rear view illustrating the rear plate with the flash member attached thereto according to an embodiment of the disclosure.

Referring to FIGS. 5A and 5B, the electronic device 101 may include a rear plate 310 and a flash member 320 attached to the rear plate 310. The configurations of the rear plate 310 and the flash member 320 of FIGS. 5A and 5B may be wholly or partially the same as those of the rear plate 211 and the flash 204 of FIG. 3.

According to various embodiments, the rear plate 310 may include a first through hole 312. According to an embodiment, the rear plate 310 may include a first surface 310a exposed to the outside of the electronic device 101, and a second surface 310b opposite to the first surface 310a. The first through hole 312 may be a hole penetrating at least a part of the rear plate 310 between the first surface 310a and the second surface 310b. According to an embodiment, the first through hole 312 may accommodate at least a part of the flash member 320.

According to various embodiments, the rear plate 310 may include at least one camera hole 314. According to an embodiment, the at least one camera hole 314 may be disposed to correspond to a camera module (e.g., the camera module 206 of FIG. 3). According to an embodiment, the camera hole 314 may be a hole penetrating at least a part of the rear plate 310 between the first surface 310a and the second surface 310b of the rear plate 310. According to an embodiment, the first through hole 312 may be spaced apart from the at least one camera hole 314. According to an embodiment, at least a part of the camera module (e.g., the camera module 180 of FIG. 1) may be visually exposed to the outside of the electronic device 101 through the camera hole 314.

According to various embodiments, the flash member 320 may emit light to the outside of the electronic device 101. For example, the flash member 320 may include a flash lens 322 and a support structure 324 accommodating the flash lens 322. According to an embodiment, the flash lens 322 may be an LED or a xenon lamp. According to an embodiment, the flash lens 322 may be electrically connected to a battery (e.g., the battery 189 of FIG. 1) and/or a processor (e.g., the processor 120 of FIG. 1). According to an embodiment, the support structure 324 may accommodate the flash lens 322. The support structure 324 may be interpreted as a housing or case of the flash member 320. According to an embodiment, the support structure 324 may face a part (e.g., the second surface 310b) of the rear plate 310.

According to various embodiments, at least a part of the flash member 320 may be disposed inside the first through hole 312. For example, at least a part of the flash member 320 may be visually exposed to the outside of the electronic device 101 through the first through hole 312. According to an embodiment, light generated by the flash lens 322 of the flash member 320 may be transmitted to the outside of the electronic device 101 through the first through hole 312. According to an embodiment, the flash member 320 may be disposed under the rear plate 310 (e.g., in the +Z direction). For example, the flash member 320 may be disposed on the second surface 310b of the rear plate 310. According to an embodiment, the flash member 320 may not overlap with a camera module (e.g., the camera module 180 of FIG. 1) for obtaining an external image through the camera hole 314 or a camera window (not shown) for protecting the camera module, in a thickness direction (e.g., Z-axis direction).

Figure 6:
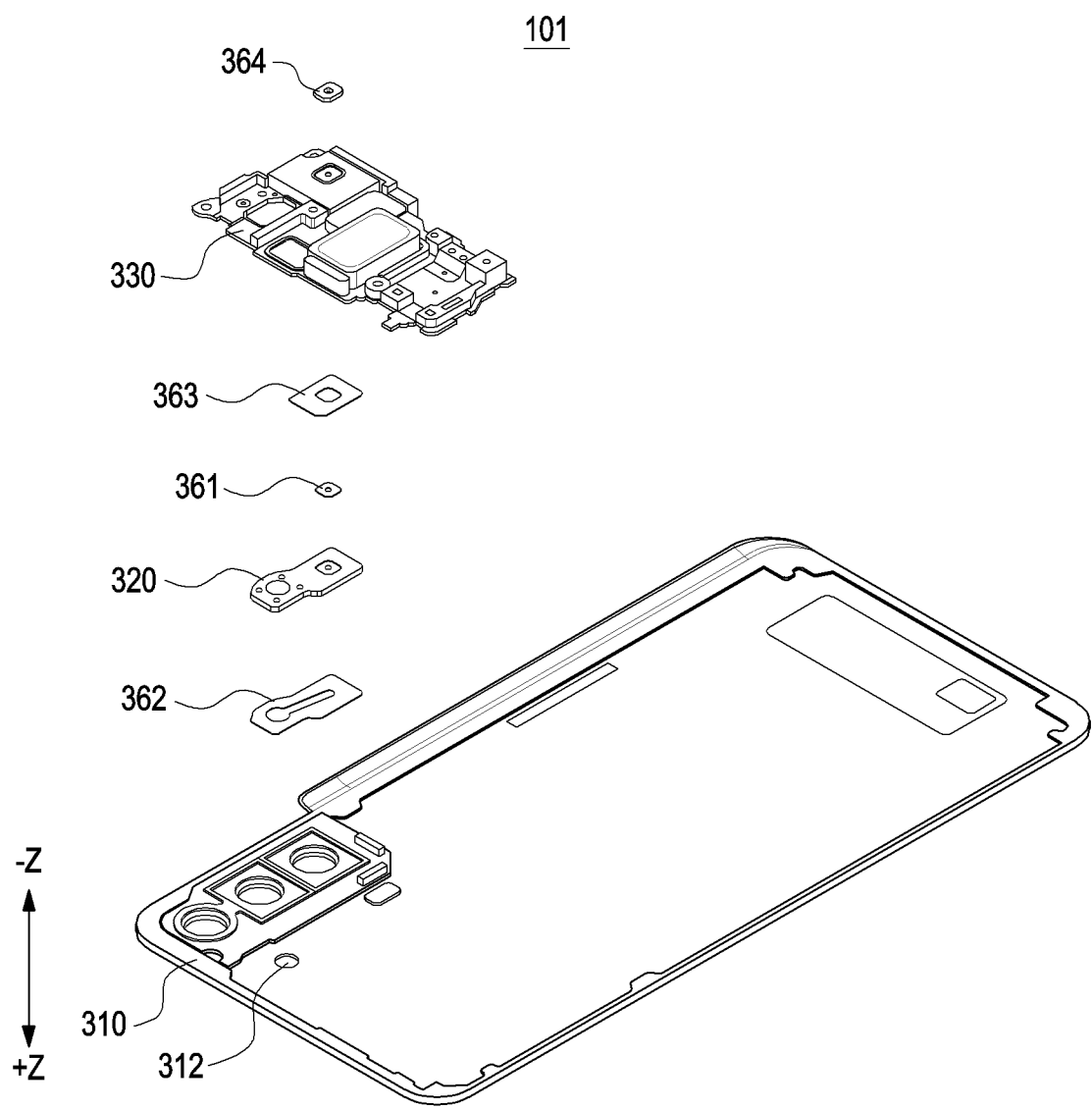
FIG. 6 is an exploded perspective view illustrating an electronic device including a rear plate and a support member according to an embodiment of the disclosure.
Figure 7:
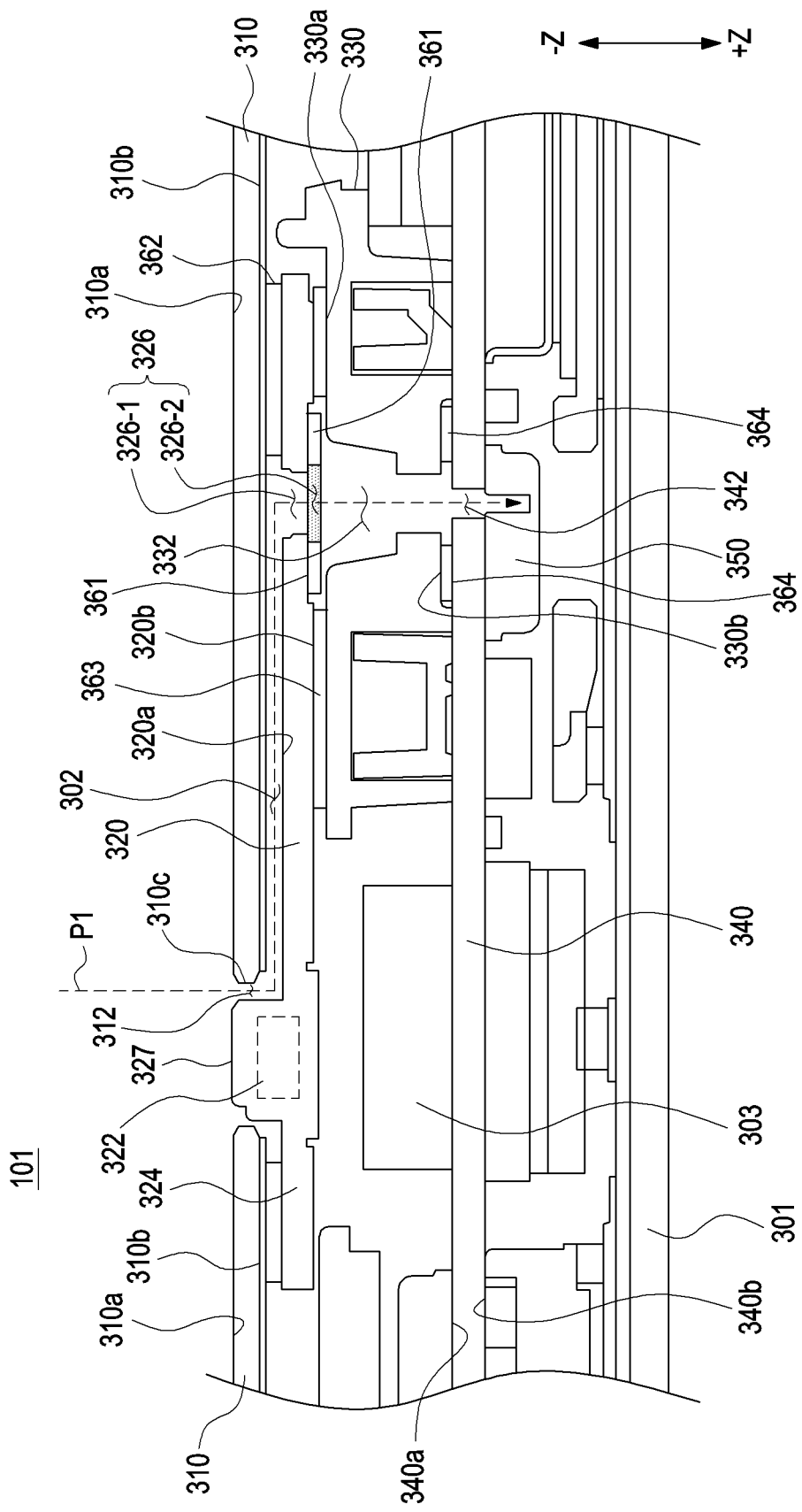
FIG. 7 is a cross-sectional view illustrating an electronic device according to an embodiment of the disclosure.

FIG. 6 is an exploded perspective view illustrating an electronic device including a rear plate and a support member according to an embodiment of the disclosure. FIG. 7 is a cross-sectional view illustrating an electronic device according to an embodiment of the disclosure.

Referring to FIGS. 6 and 7, the electronic device 101 may include a display 301, a rear plate 310, a flash member 320, a support member 330, a PCB 340, and a microphone module 350. The configurations of the display 301, the rear plate 310, the flash member 320, the support member 330, and the PCB 340 of FIGS. 6 and/or 7 may be wholly or partially the same as those of the display 220, the rear plate 310, the flash member 320, the first support member 230, and the PCB 250 of FIGS. 2, 4, 5A, and/or 5B.

According to various embodiments, the rear plate 310 may surround at least a part of the flash member 320. For example, the rear plate 310 may include a seventh surface 310c surrounding at least a part (e.g., a protrusion structure 327) of the flash member 320. According to an embodiment, the seventh surface 310c may surround at least a part of the rear plate 310 between the first surface 310a and the second surface 310b of the rear plate 310. According to an embodiment, the seventh surface 310c may form the first through hole 312. For example, at least a part of a space surrounded by the seventh surface 310c may be interpreted as the first through hole 312.

According to various embodiments, the flash member 320 may be spaced apart from the rear plate 310. According to an embodiment, the support structure 324 of the flash member 320 may include a third surface 320a facing the second surface 310b of the rear plate 310 and a fourth surface 320b opposite to the third surface 320a. The third surface 320a may be spaced apart from the second surface 310b of the rear plate 310. According to an embodiment, the flash member 320 may include the protrusion structure 327 extending or protruding from the third surface 320a of the support structure 324. At least a part of the protrusion structure 327 may face the seventh surface 310c of the rear plate 310, spaced apart from the seventh surface 310c. According to an embodiment, a gap or space between the third surface 320a and the second surface 310b and/or a gap or space between the seventh surface 310c and the protrusion structure 327 may be interpreted as an internal space 302 of the electronic device 101. For example, at least a part of the internal space 302 may be disposed between the second surface 310b and the third surface 320a. According to an embodiment, at least a part of sound or vibration transmitted from the outside of the electronic device 101 may be transmitted to the microphone module 350 through the internal space 302 disposed between the rear plate 310 and the flash member 320 of the rear plate 310.

According to various embodiments, the support structure 324 of the flash member 320 may include a second through hole 326. According to an embodiment, the second through hole 326 may penetrate the third and fourth surfaces 320a and 320b. According to an embodiment, the second through hole 326 may face the rear plate 310. For example, the second through hole 326 may be connected to the internal space 302, and sound or vibration transmitted from the outside of the electronic device 101 may be transmitted to the microphone module 350 through the internal space 302 and the second through hole 326.

According to various embodiments, the support structure 324 of the flash member 320 may include the second through hole 326. According to an embodiment, the second through hole 326 may penetrate the third and fourth surfaces 320a and 320b. According to an embodiment, the second through hole 326 may face the rear plate 310. For example, the second through hole 326 may be connected to the internal space 302, and sound or vibration transmitted from the outside of the electronic device 101 may be transmitted to the microphone module 350 through the internal space 302 and the second through hole 326.

According to various embodiments, at least a part of the second through hole 326 may be a groove or a recess. For example, the second through hole 326 may include a first portion 326-1 and a second portion 326-2. According to an embodiment, the first portion 326-1 may extend from the internal space 302 and be formed on the third surface 320a. According to an embodiment, the second portion 326-2 may extend from the first portion 326-1 to the fourth surface 320b of the flash member 320. According to an embodiment, a first waterproof member 361 may be attached on the second portion 362-2. For example, the first waterproof member 361 may be attached on a groove formed by the second portion 326-2.

According to various embodiments, the support member 330 may support the flash member 320. For example, the flash member 320 may be connected to the support member 330 using a sealing member (e.g., a first sealing member 363). According to an embodiment, the support member 330 may include an eighth surface 330a facing the fourth surface 320b of the flash member 320 and a ninth surface 330b opposite to the eighth surface 330a.

According to various embodiments, the support member 330 may include a third through hole 332. According to an embodiment, the third through hole 332 may face at least a part of the second through hole 326. For example, external sound or vibration of the electronic device 101 may be transmitted to the third through hole 332 through the internal space 302 and the second through hole 326. According to an embodiment, the third through hole 332 may penetrate at least a part of the support member 330 between the eighth surface 330a and the ninth surface 330b.

According to various embodiments, the PCB 340 may include a fourth through hole 342. According to an embodiment, at least a part of the fourth through hole 342 may face at least a part of the third through hole 332. For example, external sound or vibration of the electronic device 101 may be transmitted to the fourth through hole 342 through the internal space 302, the second through hole 326, and the third through hole 332. According to an embodiment, the PCB 340 may include a fifth surface 340a facing the support member 330 and a sixth surface 340b opposite to the fifth surface 340a. According to an embodiment, the fourth through hole 342 may penetrate at least a part of the PCB 340 between the fifth surface 340a and the sixth surface 340b. According to an embodiment, the PCB 340 may be connected to the support member 330. For example, the PCB 340 may be connected to the support member 330 through a second sealing member 364. According to an embodiment, the PCB 340 may be disposed under the support member 330 (e.g., in the +Z direction). For example, the PCB 340 may be disposed on the ninth surface 330b of the support member 330.

According to various embodiments, the PCB 340 may accommodate at least one electronic component 303. For example, the PCB 340 may accommodate the microphone module 350. According to an embodiment, the microphone module 350 may be disposed on the sixth surface 340b of the PCB 340.

According to various embodiments, the microphone module 350 may obtain sound from the outside of the electronic device 101. For example, the microphone module 350 may obtain sound transmitted through a first path P1. The first path P1 may be interpreted as the internal space 302, the second through hole 326, the third through hole 332, and the fourth through hole 342. According to an embodiment, the first path P1 may be interpreted as a microphone duct. According to an embodiment, the microphone module 350 may cover the second through hole 326, the third through hole 332, and/or the fourth through hole 342. For example, the microphone module 350 may overlap with at least a part of the second through hole 326, the third through hole 332, and/or the fourth through hole 342. The configuration of the microphone module 350 may be wholly or partially the same as that of the audio module 170 of FIG. 1.

According to various embodiments, the electronic device 101 may include the first waterproof member 361. According to an embodiment, the first waterproof member 361 may reduce or prevent introduction of moisture or a foreign material through the second through hole 326 into the electronic device 101. According to an embodiment, the first waterproof member 361 may be attached under the flash member 320 (e.g., in the +Z direction). For example, the first waterproof member 361 may be disposed on the second portion 326-2 of the flash member 320 and cover the second through hole 326. According to an embodiment, at least a part of the first waterproof member 361 may overlap with the second through hole 326. According to an embodiment, at least a part of the first waterproof member 361 may include a plurality of through holes. For example, at least a part of the first waterproof member 361 may be formed in a mesh shape.

According to various embodiments, the electronic device 101 may include a second waterproof member 362. According to an embodiment, the second waterproof member 362 may reduce or prevent introduction of moisture or a foreign material into a gap (e.g., the internal space 302) between the rear plate 310 and the flash member 320. According to an embodiment, the second waterproof member 362 may be disposed between the rear plate 310 and the flash member 320. For example, the second waterproof member 362 may be disposed between the second surface 310b of the rear plate 310 and the third surface 320a of the flash member 320. According to an embodiment, the second waterproof member 362 may be a waterproof tape. According to an embodiment, the second waterproof member 362 may be formed in a closed loop shape. For example, the second waterproof member 362 may surround at least a part of the first path P1, and reduce or prevent leakage of sound or vibration transmitted from the outside of the electronic device 101 to the microphone module 350. According to an embodiment, the second waterproof member 362 may reduce or prevent transmission of light generated by the flash lens 322 into the electronic device 101. For example, the second waterproof member 362 may absorb at least a part of light generated by the flash lens 322 of the flash member 320.

According to various embodiments, the electronic device 101 may include the first sealing member 363. According to an embodiment, the first sealing member 363 may connect the flash member 320 and the support member 330 to each other. For example, the first sealing member 363 may be an adhesive tape or an adhesive. According to an embodiment, the first sealing member 363 may be disposed between the flash member 320 and the support member 330. For example, the first sealing member 363 may be disposed between the fourth surface 320b of the flash member 320 and the eighth surface 330a of the support member 330. According to an embodiment, the first sealing member 363 may reduce or prevent leakage of sound or vibration transmitted to the microphone module 350. For example, the first sealing member 363 may reduce or prevent leakage of sound or vibration from a space between the flash member 320 and the support member 330. According to an embodiment, the first sealing member 363 may be formed in a closed loop shape.

According to various embodiments, the electronic device 101 may include the second sealing member 364. According to an embodiment, the second sealing member 364 may reduce or prevent leakage of sound or vibration transmitted to the microphone module 350. For example, the second sealing member 364 may reduce or prevent leakage of sound or vibration from a space between the support member 330 and the PCB 340. According to an embodiment, the second sealing member 364 may be disposed between the support member 330 and the PCB 340. For example, the second sealing member 364 may be disposed between the ninth surface 330b of the support member 330 and the fifth surface 340a of the PCB 340. According to an embodiment, the second sealing member 364 may be formed in a closed loop shape. According to an embodiment, the second sealing member 364 may include foam. For example, the second sealing member 364 may be a sponge.

Figure 8:
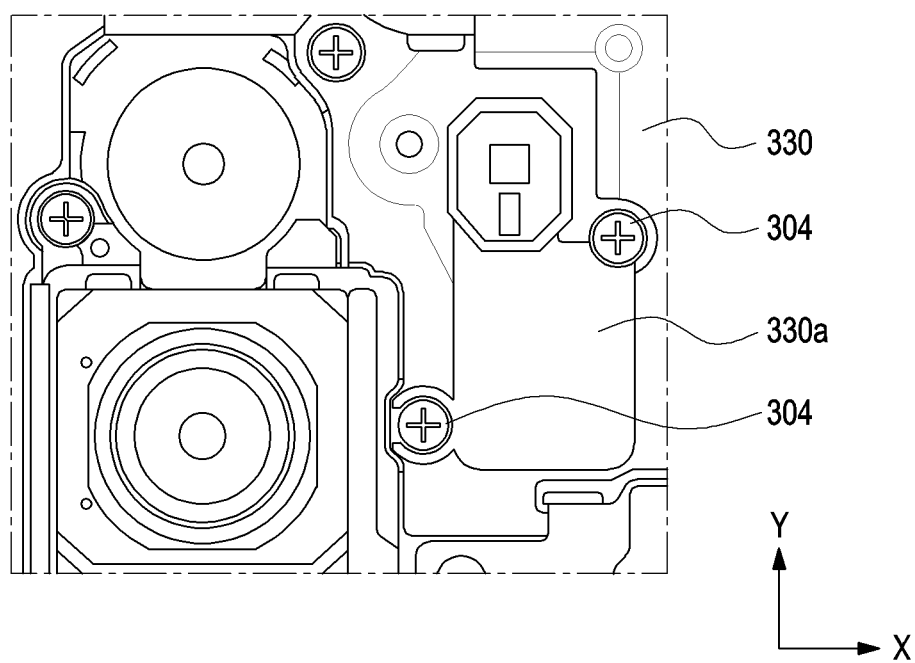
FIG. 8 is a diagram illustrating a coupling structure between a support member and a printed circuit board according to an embodiment of the disclosure.

FIG. 8 is a diagram illustrating a coupling structure between a support member and a PCB according to an embodiment of the disclosure.

Referring to FIG. 8, the electronic device 101 may include at least one fastening structure 304 to connect the support member 330 to a PCB (e.g., the PCB 340 of FIG. 7). The configuration of the support member 330 of FIG. 8 may be wholly or partially the same as that of the first support member 230 of FIG. 4.

According to various embodiments, the fastening structure 304 may couple the support member 330 with the PCB (e.g., the PCB 340 of FIG. 7). For example, the fastening structure 304 may connect the support member 330 to the PCB 340, together with the first sealing member 363 (e.g., the first sealing member 363 of FIG. 7). According to an embodiment, the support member 330 may be fixed to the PCB 340 using the fastening structure 304, and reduce or prevent leakage of sound between the support member 330 and the PCB 340 caused by a repulsive force of the second sealing member (e.g., the second sealing member 364 of FIG. 7). According to an embodiment, the fastening structure 304 may be connected to the support member 330 (e.g., the first support member 230 of FIG. 4), the PCB 340, and the second support member (e.g., the second support member 240 of FIG. 4). For example, the support member 330 and the PCB 340 may be connected to the second support member 240 through the fastening structure 304. According to an embodiment, the fastening structure 304 may be a boss structure or a screw structure. According to an embodiment, the support member 330 may include the eighth surface 330a (e.g., the eighth surface 330a of FIG. 7) on which the first sealing member 363 is disposed.

Figure 9:
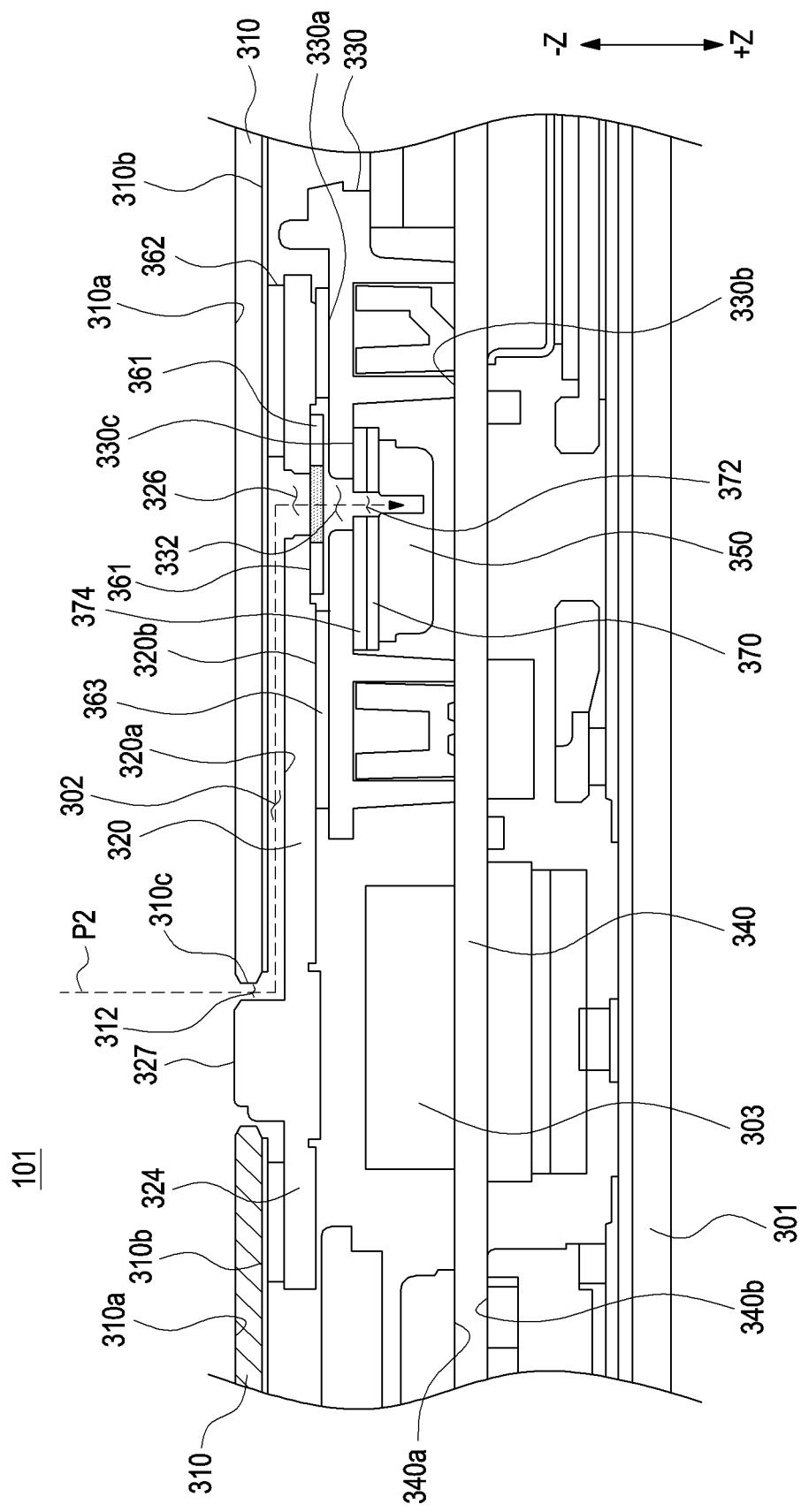
FIG. 9 is a cross-sectional view illustrating an electronic device according to an embodiment of the disclosure.
Figure 10:
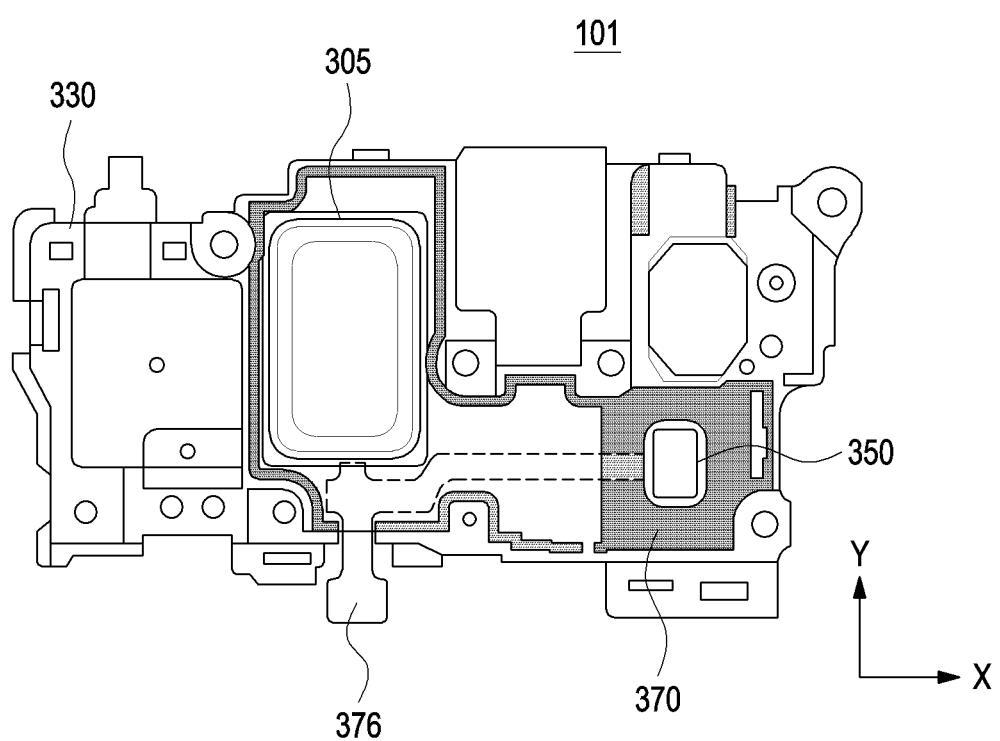
FIG. 10 is a diagram illustrating a structure in which a microphone module is disposed on a support member according to an embodiment of the disclosure.

FIG. 9 is a cross-sectional view illustrating an electronic device according to an embodiment of the disclosure. FIG. 10 is a diagram illustrating a structure in which a microphone module is disposed on a support member according to an embodiment of the disclosure.

Referring to FIGS. 9 and 10, the electronic device 101 may include the display 301, the rear plate 310, the flash member 320, the support member 330, the PCB 340, the microphone module 350, the first waterproof member 361, the second waterproof member 362, and the first sealing member 363. The configurations of the display 301, the rear plate 310, the flash member 320, the support member 330, the PCB 340, the microphone module 350, the first waterproof member 361, the second waterproof member 362, and the first sealing member 363 of FIGS. 9 and 10 may be wholly or partially the same as those of the display 301, the rear plate 310, the flash member 320, the support member 330, the PCB 340, the microphone module 350, the first waterproof member 361, the second waterproof member 362, and the first sealing member 363 of FIG. 7.

According to various embodiments, the electronic device 101 may include a flexible printed circuit board (FPCB) 370. According to an embodiment, the FPCB 370 may include a fifth through hole 372 facing at least a part of the third through hole 332. For example, sound or vibration from the outside of the electronic device 101 may be transmitted to the fifth through hole 372 through the internal space 302, the second through hole 326, and the third through hole 332. According to an embodiment, the FPCB 370 may be attached to the support member 330 through the second sealing member 374. According to an embodiment, the second sealing member 374 may be disposed on a tenth surface 330c of the support member 330.

According to various embodiments, the FPCB 370 may accommodate electronic components (e.g., the microphone module 350 and/or the speaker module 305). According to an embodiment, at least a part of the FPCB 370 may be disposed between the microphone module 350 and the support member 330. According to an embodiment, the FPCB 370 may be electrically connected to the electronic component 303 disposed on the PCB 340. For example, the FPCB 370 may include a connector structure 376 to be connected to the PCB 340.

According to various embodiments, the microphone module 350 may obtain sound from the outside of the electronic device 101. For example, the microphone module 350 may obtain sound transmitted through a second path P2. The second path P2 may be interpreted as the internal space 302, the second through hole 326, the third through hole 332, and the fifth through hole 372. According to an embodiment, the second path P2 may be interpreted as a microphone duct. According to an embodiment, the microphone module 350 may be disposed under the FPCB 370 (e.g., in the +Z direction). According to an embodiment, the length of the second path P2 may be less than the length of the first path (e.g., the first path P1 of FIG. 7). Based on the length of a path through which the microphone module 350 obtains sound, a resonant frequency of the electronic device 101 and/or the magnitude of sound obtained by the microphone module 350 may be changed. For example, the resonant frequency band of the electronic device 101 including the microphone module 350 disposed under the support member 330 (e.g., in the +Z direction) using the FPCB 370 (e.g., FIG. 9) and/or the magnitude of sound introduced into the microphone module 350 may be greater than the resonant frequency band of the electronic device 101 (e.g., FIG. 7) including the microphone module 350 disposed under the support member 330 (e.g., in the +Z direction) and/or the magnitude of sound introduced into the microphone module 350.

Figure 11A:
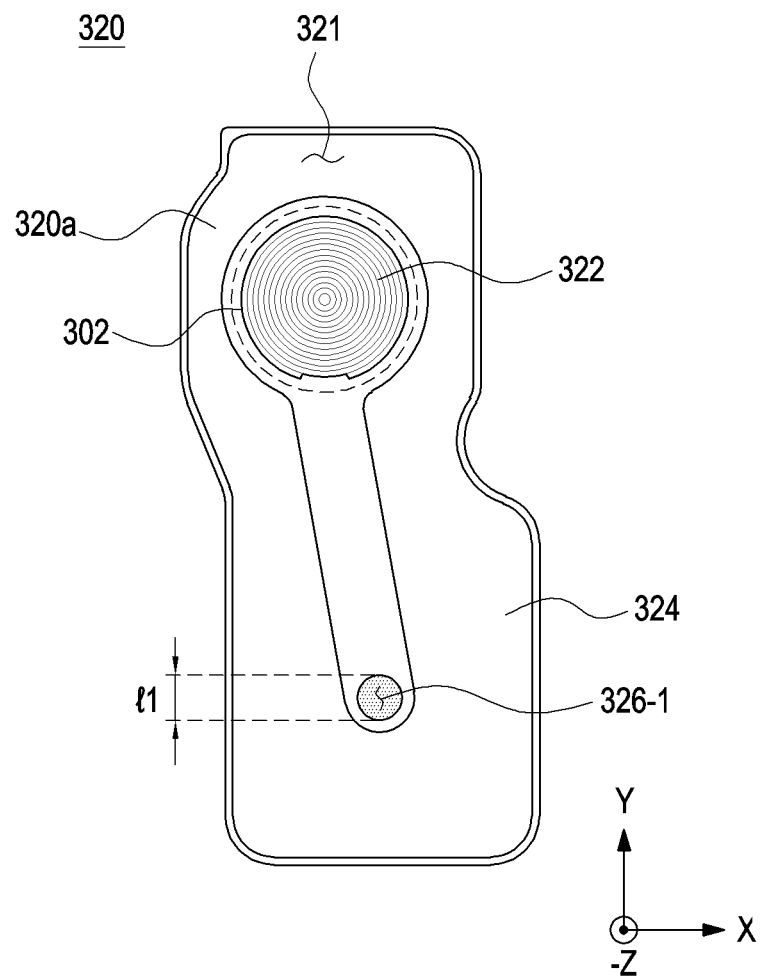
FIG. 11A is a front view illustrating a flash member according to an embodiment of the disclosure.
Figure 11B:
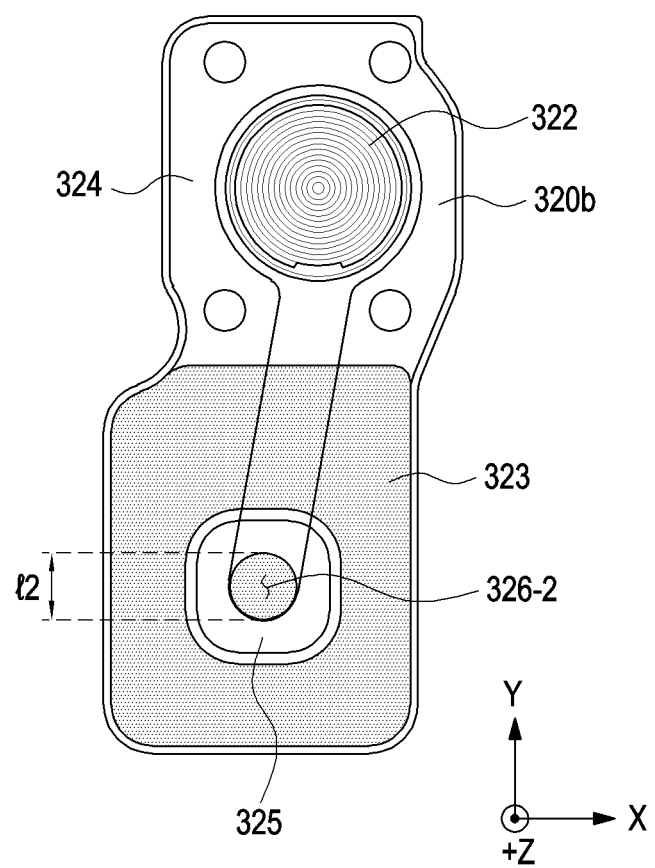
FIG. 11B is a rear view illustrating the flash member according to an embodiment of the disclosure.

FIG. 11A is a front view illustrating a flash member according to an embodiment of the disclosure, and FIG. 11B is a rear view illustrating the flash member according to an embodiment of the disclosure.

Referring to FIGS. 11A and 11B, the flash member 320 may include the flash lens 322 and the support structure 324. The configuration of the flash member 320 of FIGS. 11A and 11B may be wholly or partially the same as that of the flash member 320 of FIGS. 5A and 5B.

According to various embodiments, the flash member 320 may include a first area 321 facing the second waterproof member (e.g., the second waterproof member 362 of FIG. 6). The first area 321 may be at least a part of the third surface 320a of the flash member 320. According to an embodiment, the first area 321 may surround at least a part of the flash lens 322.

According to various embodiments, at least a part of sound or vibration introduced through the internal space 302 (e.g., the internal space 302 of FIG. 7) between the flash lens 322 and the first area 321 may be transmitted to the first portion 326-1. According to an embodiment, at least a part of the sound or vibration transmitted to the first portion 326-1 may be transmitted to the second portion 326-2. According to an embodiment, the cross-sectional area of the second portion 326-2 may be larger than that of the first portion 326-1. For example, a second length 12 of the second portion 326-2 may be greater than a first length 11 of the first portion 326-1.

According to various embodiments, the flash member 320 may include a second area 323 facing the first sealing member (e.g., the first sealing member 363 of FIG. 6). The second area 323 may be at least a part of the fourth surface 320b of the flash member 320. According to an embodiment, the second area 323 may surround at least a part of the second portion 326-2.

According to various embodiments, the flash member 320 may include a third area 325 facing the first waterproof member (e.g., the first waterproof member 361 of FIG. 6). According to an embodiment, the third area 325 may form at least a part of the second portion 326-2. According to an embodiment, the third area 325 may be substantially parallel to the second area 323.

Figure 12:
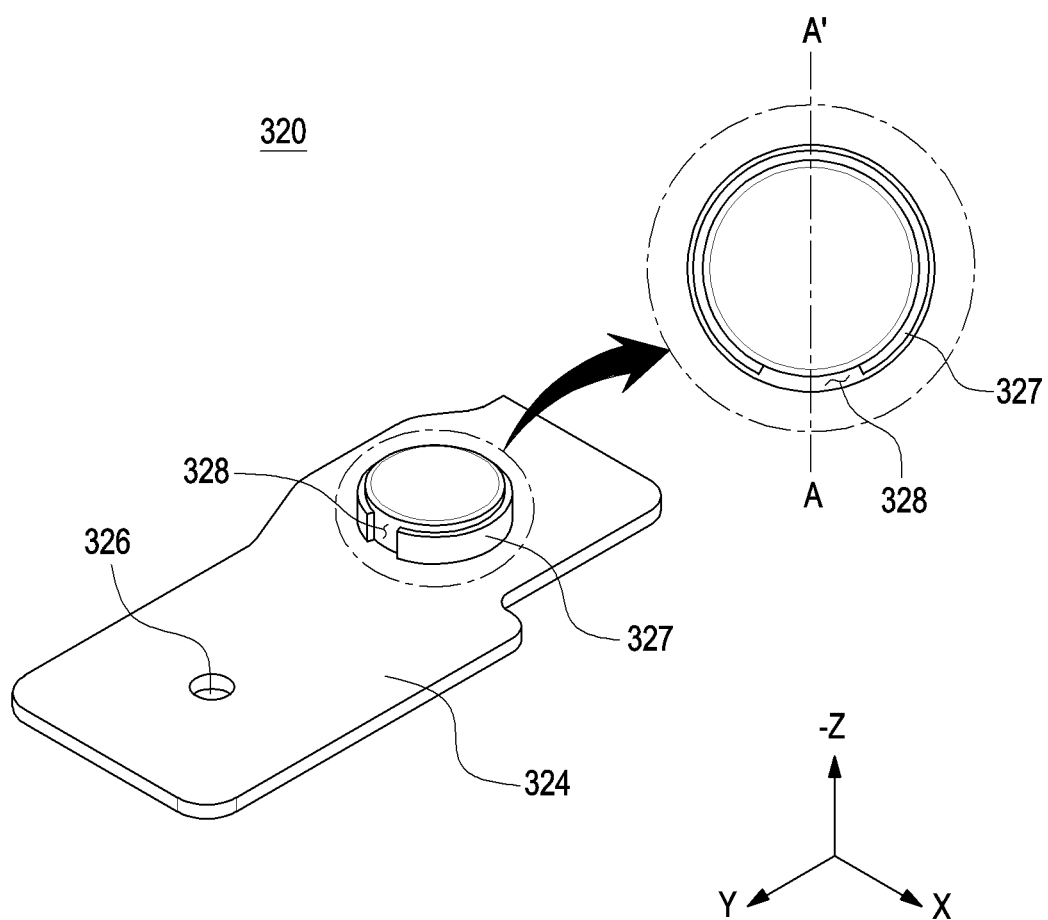
FIG. 12 is a perspective view illustrating a flash member including a groove structure according to an embodiment of the disclosure.
Figure 13:
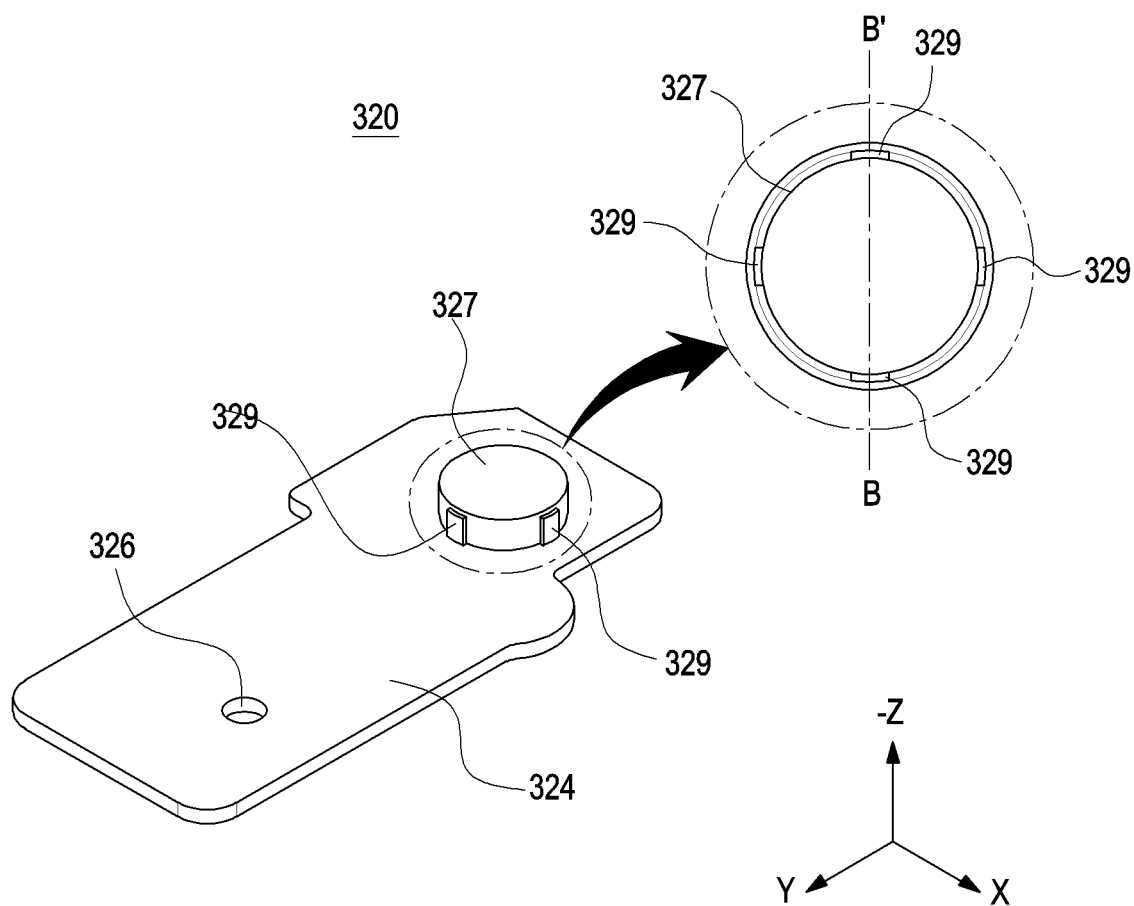
FIG. 13 is a perspective view illustrating a flash member including a bump structure according to an embodiment of the disclosure.
Figure 14:
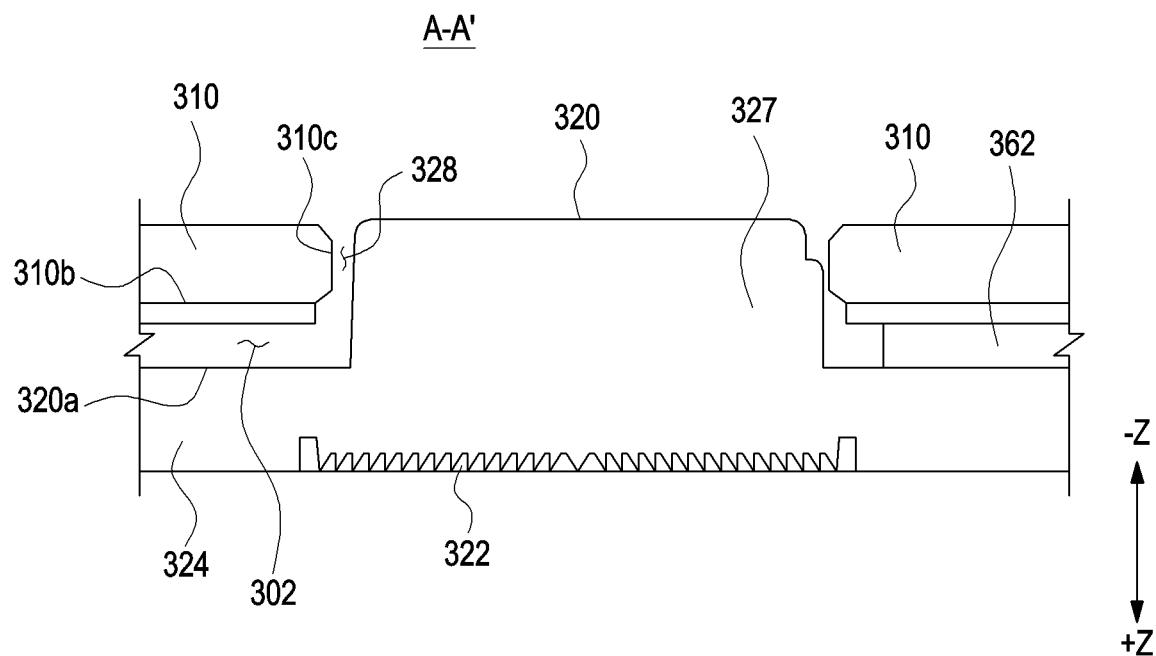
FIG. 14 is a cross-sectional view taken along line A-A' of FIG. 12 according to an embodiment of the disclosure.
Figure 15:
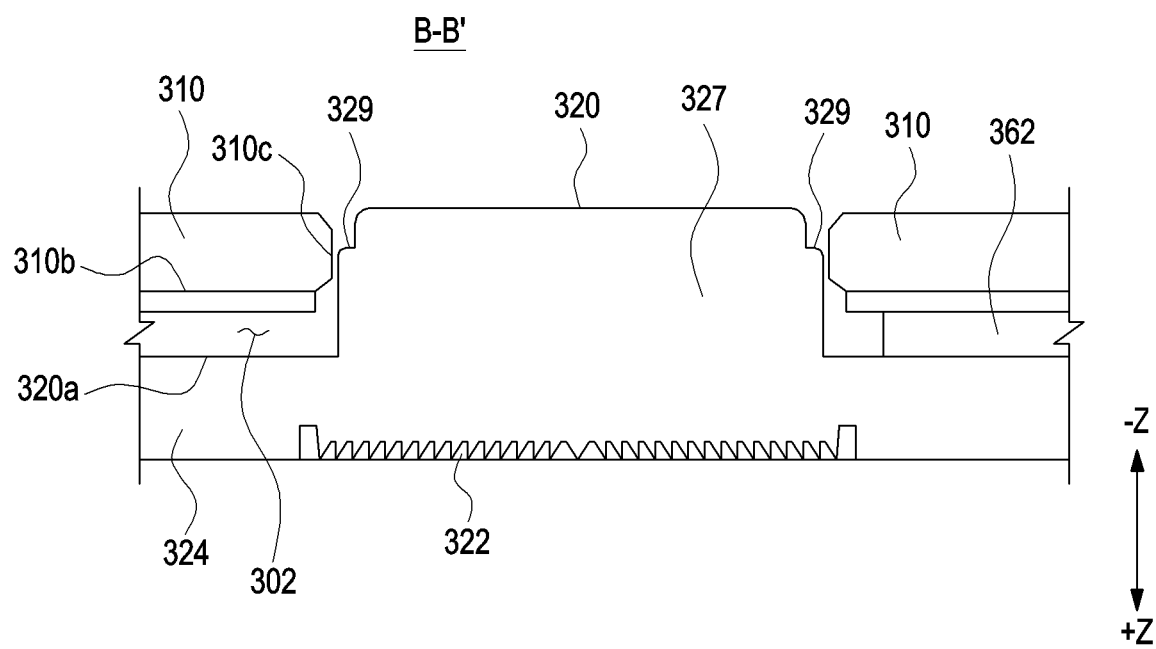
FIG. 15 is a cross-sectional view taken along plane B-B' of FIG. 13 according to an embodiment of the disclosure.

FIG. 12 is a perspective view illustrating a flash member including a groove structure according to an embodiment of the disclosure, and FIG. 13 is a perspective view illustrating the flash member including the protrusion structure according to an embodiment of the disclosure. FIG. 14 is a cross-sectional view taken along line A-A' of FIG. 12 according to an embodiment of the disclosure, and FIG. 15 is a cross-sectional view taken along plane B-B' of FIG. 13 according to an embodiment of the disclosure.

Referring to FIGS. 12 to 15, the flash member 320 may include a protrusion structure 327 extending from the support structure 324. According to an embodiment, the protrusion structure 327 may be interpreted as a partial area of the flash member 320 surrounded by the first through hole (e.g., the first through hole 312 of FIG. 7) of the rear plate (e.g., the rear plate 310 of FIG. 7). According to an embodiment, at least a part of the protrusion structure 327 may be visually exposed to the outside of the electronic device (e.g., the electronic device 101 of FIG. 7). For example, light generated by the flash lens 322 may pass through the protrusion structure 327 and be radiated to the outside of the electronic device 101. The configuration of the flash member 320 of FIGS. 12 to 15 may be wholly or partially the same as that of the flash member 320 of FIG. 7.

According to various embodiments (e.g., FIGS. 12 and 14), the flash member 320 may include at least one groove structure 328 formed in the protrusion structure 327. According to an embodiment, the groove structure 328 may increase the amount of air introduced into the microphone module (e.g., the microphone module 350 of FIG. 7). For example, the volume of the internal space (e.g., the internal space 302 of FIG. 7) between the rear plate (e.g., the rear plate 310 of FIG. 7) and the flash member 320 may be increased by the groove structure 328, and the amount (volume and/or mass) of air transmitted to the second through hole 326 through the internal space 302 may be increased. According to an embodiment, the groove structure 328 may guide air from the outside of the electronic device 101 to the second through hole 326. For example, the groove structure 328 may be disposed on the protrusion structure 327 toward the second through hole 326.

According to various embodiments (e.g., FIGS. 13 and 15), the flash member 320 may include at least one bump structure 329 formed on the protrusion structure 327. According to an embodiment, the bump structure 329 may protrude toward a part (e.g., the seventh surface 310c of FIG. 7) of the rear plate (e.g., the rear plate 310 of FIG. 7). According to an embodiment, the bump structure 329 may increase the amount of air introduced into the microphone module 350. For example, a part of the protrusion structure 327 in which the bump structure 329 is not formed may be interpreted as the groove structure 328. According to an embodiment, the bump structure 329 may guide connection or coupling between the flash member 320 and the rear plate 310. For example, the rear plate (e.g., the rear plate 310 of FIG. 7) may include a groove (not shown) corresponding to the bump structure 329, and the bump structure 329 may be inserted into the groove. According to an embodiment, the flash member 320 may not include the groove structure 328 and/or the bump structure 329.

According to various embodiments of the disclosure, an electronic device (e.g., the electronic device 101 of FIG. 2) may include a rear plate (e.g., the rear plate 310 of FIG. 5A) including a first through hole (e.g., the first through hole 312 of FIG. 5A), a flash member (e.g., the flash member 320 of FIG. 7) at least partially disposed within the first through hole and including a flash lens (e.g., the flash lens 322 of FIG. 11A) and a support structure (e.g., the support structure 324 of FIG. 11A) accommodating the flash lens and including a second through hole (e.g., the second through hole 326 of FIG. 7) facing the rear plate, a support member (e.g., the first support member 230 of FIG. 4 or the support member 330 of FIG. 6) supporting the flash member and including a third through hole (e.g., the third through hole 332 of FIG. 7) facing at least a part of the second through hole, and a microphone module (e.g., the microphone module 350 of FIG. 7) disposed under the support member and covering the third through hole.

According to various embodiments, the rear plate may include a first surface (e.g., the first surface 310a of FIG. 7) exposed to an outside of the electronic device and a second surface (e.g., the second surface 310b of FIG. 7) opposite to the first surface, the support structure of the flash member may include a third surface (e.g., the third surface 320a of FIG. 7) facing the second surface and a fourth surface (e.g., the fourth surface 320b of FIG. 7) opposite to the third surface, and the second through hole may penetrate at least a part of the support structure of the flash member between the third surface and the fourth surface.

According to various embodiments, at least a part of the microphone module may be configured to obtain sound from the outside of the electronic device through an internal space (e.g., the internal space 302 of FIG. 7) at least partially disposed between the second surface and the third surface and the second through hole.

According to various embodiments, the electronic device may further include a PCB (e.g., the PCB 340 of FIG. 7) accommodating at least one electronic component and disposed under the support member.

According to various embodiments, the PCB may include a fifth surface (e.g., the fifth surface 340a of FIG. 7) facing the support member, a sixth surface (e.g., the sixth surface 340b of FIG. 7) opposite to the fifth surface, and a fourth through hole (e.g., the fourth through hole 342 of FIG. 7) penetrating between the fifth surface and the sixth surface and facing the third through hole, and the microphone module may cover the fourth through hole and be disposed on the sixth surface.

According to various embodiments, the electronic device may further include a second sealing member (e.g., the second sealing member 364 of FIG. 7) disposed between the support member and the PCB.

According to various embodiments, the electronic device may further include an FPCB (e.g., the FPCB 370 of FIG. 9) connected to the support member and including a fifth through hole (e.g., the fifth through hole 372 of FIG. 9) facing the third through hole, and the microphone module may cover the fifth through hole and be disposed under the FPCB.

According to various embodiments, the rear plate may include a seventh surface (e.g., the seventh surface 310c of FIG. 7) surrounding at least a part of the flash member, and the flash member may include a protrusion structure (e.g., the protrusion structure 327 of FIG. 7) extending from the support structure and facing the seventh surface.

According to various embodiments, the flash member may include at least one of at least one groove structure (e.g., the groove structure 328 of FIG. 12) formed on the protrusion structure or at least one bump structure (e.g., the bump structure 329 of FIG. 13) protruding from the protrusion structure toward the seventh surface.

According to various embodiments, the electronic device may further include at least one fastening structure (e.g., the fastening structure 304 of FIG. 8) connecting the support member and the PCB to each other.

According to various embodiments, the electronic device may further include a first waterproof member (e.g., the first waterproof member 361 of FIG. 7) disposed under the flash member and covering the second through hole.

According to various embodiments, the second through hole may include a first portion (e.g., the first portion 326-1 of FIG. 7) extending from an internal space and a second portion (e.g., the second portion 326-2 of FIG. 7) extending from the first portion and having the first waterproof member attached thereto, and a cross-sectional area of the second portion may be larger than a cross-sectional area of the first portion. According to various embodiments, the electronic device may further include a second waterproof member (e.g., the second waterproof member 362 of FIG. 7) disposed between the flash member and the rear plate.

According to various embodiments, the electronic device may further include a first sealing member (e.g., the first sealing member 363 of FIG. 7) disposed between the flash member and the support member.

According to various embodiments, the rear plate may include at least one camera hole (e.g., the camera hole 341 of FIG. 5A) spaced apart from the first through hole, and the electronic device may further include a camera module (e.g., the camera module 180 of FIG. 1) at least partially exposed visually to an outside of the electronic device through the at least one camera hole.

According to various embodiments of the disclosure, an electronic device (e.g., the electronic device 101 of FIG. 2) may include a rear plate (e.g., the rear plate 310 of FIG. 5A) including a first through hole (e.g., the first through hole 312 of FIG. 5A), a flash member (e.g., the flash member 320 of FIG. 7) including a support structure (e.g., the support structure 324 of FIG. 11A) including a second through hole (e.g., the second through hole 326 of FIG. 7) facing the rear plate, and a protrusion structure (e.g., the protrusion structure 327 of FIG. 7) extending from the support structure and at least partially disposed within the first through hole, a support member (e.g., the support member 330 of FIG. 7) supporting the flash member and including a third through hole (e.g., the third through hole 332 of FIG. 7) facing at least a part of the second through hole, a PCB (e.g., the PCB 340 of FIG. 7) including a fourth through hole (e.g., the fourth through hole 342 of FIG. 7) facing the third through hole, and a microphone module (e.g., the microphone module 350 of FIG. 7) disposed on the PCB and covering the second through hole, the third through hole, and the fourth through hole.

According to various embodiments, the rear plate may include a first surface (e.g., the first surface 310a of FIG. 7) exposed to an outside of the electronic device and a second surface (e.g., the second surface 310b of FIG. 7) opposite to the first surface, the support structure of the flash member may include a third surface (e.g., the third surface 320a of FIG. 7) facing the second surface and a fourth surface (e.g., the fourth surface 320b of FIG. 7) opposite to the third surface, and the second through hole may penetrate at least a part of the support structure of the flash member between the third surface and the fourth surface.

According to various embodiments, at least a part of the microphone module may be configured to obtain sound from the outside of the electronic device through an internal space (e.g., the internal space 302 of FIG. 7) at least partially disposed between the second surface and the third surface, the second through hole, the third through hole, and the fourth through hole.

According to various embodiments, the electronic device may further include a second sealing member (e.g., the second sealing member 364 of FIG. 7) disposed between the support member and the PCB.

According to various embodiments, the rear plate may include a seventh surface (e.g., the seventh surface 310c of FIG. 7) surrounding at least a part of the protrusion structure, and the flash member may include at least one of at least one groove structure (e.g., the groove structure 328 of FIG. 12) formed on the protrusion structure or at least one bump structure (e.g., the bump structure 329 of FIG. 13) protruding from the protrusion structure toward the seventh surface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a rear plate including a first through hole;
   a flash member at least partially disposed within the first through hole and including:
   a flash lens, and
   a support structure accommodating the flash lens and including a second through hole facing the rear plate;
   a support member supporting the flash member and including a third through hole facing at least a part of the second through hole; and
   a microphone module disposed under the support member and configured to receive sound through the first through hole, the second through hole, and the third through hole.

2. The electronic device of claim 1,
   wherein the rear plate includes a first surface exposed to an outside of the electronic device and a second surface opposite to the first surface,
   wherein the support structure of the flash member includes a third surface facing the second surface and a fourth surface opposite to the third surface, and
   wherein the second through hole penetrates at least a part of the support structure of the flash member between the third surface and the fourth surface.

3. The electronic device of claim 2, wherein at least a part of the microphone module is configured to obtain sound from the outside of the electronic device through an internal space at least partially disposed between the second surface and the third surface, the second through hole, and the third through hole.

4. The electronic device of claim 2, further comprising:
   a first waterproof member disposed under the flash member and covering the second through hole.

5. The electronic device of claim 4,
   wherein the second through hole includes a first portion extending from an internal space between the second surface and the third surface and a second portion extending from the first portion and having the first waterproof member attached thereto, and
   wherein a cross-sectional area of the second portion is larger than a cross-sectional area of the first portion.

6. The electronic device of claim 1, further comprising:
   a printed circuit board accommodating at least one electronic component and disposed under the support member.

7. The electronic device of claim 6,
   wherein the printed circuit board includes a fifth surface facing the support member, a sixth surface opposite to the fifth surface, and a fourth through hole penetrating between the fifth surface and the sixth surface and facing the third through hole, and
   wherein the microphone module covers the fourth through hole and is disposed on the sixth surface.

8. The electronic device of claim 7, further comprising:
   a second sealing member disposed between the support member and the printed circuit board.

9. The electronic device of claim 6, further comprising:
   a flexible printed circuit board connected to the support member and including a fifth through hole facing the third through hole,
   wherein the microphone module covers the fifth through hole and is disposed under the flexible printed circuit board.

10. The electronic device of claim 6, further comprising:
at least one fastening structure connecting the support member and the printed circuit board to each other.

11. The electronic device of claim 1,
wherein the rear plate includes a seventh surface surrounding at least a part of the flash member, and
wherein the flash member includes a protrusion structure extending from the support structure and facing the seventh surface.

12. The electronic device of claim 11, wherein the flash member includes at least one of at least one groove structure formed on the protrusion structure or at least one bump structure protruding from the protrusion structure toward the seventh surface.

13. The electronic device of claim 1, further comprising:
a second waterproof member disposed between the flash member and the rear plate.

14. The electronic device of claim 1, further comprising:
a first sealing member disposed between the flash member and the support member.

15. The electronic device of claim 1,
wherein the rear plate includes at least one camera hole spaced apart from the first through hole, and
wherein the electronic device further comprises a camera module at least partially exposed visually to an outside of the electronic device through the at least one camera hole.

16. An electronic device comprising:
a rear plate including a first through hole;
a flash member including:
  a support structure including a second through hole facing the rear plate, and
  a protrusion structure extending from the support structure and at least partially disposed within the first through hole;
a support member supporting the flash member and including a third through hole facing at least a part of the second through hole;
a printed circuit board disposed on the support member and including a fourth through hole facing the third through hole; and
a microphone module disposed on the printed circuit board and configured to receive sound through the first through hole, the second through hole, the third through hole, and the fourth through hole.

17. The electronic device of claim 16,
wherein the rear plate includes a first surface exposed to an outside of the electronic device and a second surface opposite to the first surface,
wherein the support structure of the flash member includes a third surface facing the second surface and a fourth surface opposite to the third surface, and
wherein the second through hole penetrates at least a part of the support structure of the flash member between the third surface and the fourth surface.

18. The electronic device of claim 17, wherein at least a part of the microphone module is be configured to obtain sound from the outside of the electronic device through an internal space at least partially disposed between the second surface and the third surface, the second through hole, the third through hole, and the fourth through hole.

19. The electronic device of claim 16, further comprising:
a second sealing member disposed between the support member and the printed circuit board.

20. The electronic device of claim 16,
wherein the rear plate includes a seventh surface surrounding at least a part of the protrusion structure, and
wherein the flash member includes at least one of at least one groove structure formed on the protrusion structure or at least one bump structure protruding from the protrusion structure toward the seventh surface.

21. The electronic device of claim 16, wherein the second through hole, the third through hole, and the fourth through hole are aligned each other, and the first through hole and the second through hole are mis-aligned.

22. The electronic device of claim 16, wherein the sound is received through a gap formed between the protrusion structure and the rear plate in the first through hole.

* * * * *